Aug. 5, 1958   C. BRAMMING   2,846,105
VACUUM-BOTTLE SEAL

Filed Sept. 26, 1957   2 Sheets-Sheet 1

INVENTOR
CARL BRAMMING
by: Ooms, McDougall,
Williams & Hersh
ATTYS.

Aug. 5, 1958 — C. BRAMMING — 2,846,105
VACUUM-BOTTLE SEAL
Filed Sept. 26, 1957 — 2 Sheets-Sheet 2

INVENTOR
CARL BRAMMING
by: Ooms, McDougall, Williams & Hersh
ATTYS

United States Patent Office 2,846,105
Patented Aug. 5, 1958

2,846,105
VACUUM-BOTTLE SEAL

Carl Bramming, Nashville, Tenn., assignor to Aladdin Industries, Incorporated, Nashville, Tenn., a corporation of Illinois Application September 26, 1957, Serial No. 686,474

8 Claims. (Cl. 215—13)

This invention relates to the vacuum-bottle art and is particularly addressed to improved sealing means which may be employed in such bottles to provide a liquid seal and support between the upper end of the vacuum-insulated glass filler and the adjacent portions of the surrounding protective jacket. The present invention constitutes an improvement on my vacuum-bottle seal disclosed and claimed in copending application Serial No. 594,029, filed June 26, 1956.

An object of the present invention is to provide a sealing means between the filler and the jacket of a vacuum bottle that will form a secure liquid seal despite small variations in size of the filler and notwithstanding small irregularities in the upper surface thereof.

A further object of the invention is to provide a vacuum bottle comprising a sealing gasket that may be made from polyethylene or other similar plastic and which will, despite the relative hardness of such material, seal off against liquid leakage the space between the glass filler and the protective jacket of the bottle.

Another object of the invention is to provide, in a vacuum bottle, a plastic sealing gasket between the glass filler and the protective jacket which can adapt itself to small dimensional variations in the size of the filler and which provides a double annular seal around the glass filler to prevent leakage of liquid into the space below the gasket.

Supplementing the last-mentioned object, a further object of the invention is to provide, in a vacuum bottle, a sealing gasket wherein two annular seals are provided, one of such seals being achieved by tension forces within the gasket independently of the relative pressure forces normally provided in vacuum bottles between the outer jacket and the filler. By achieving this object, my invention provides substantially improved assurance against leak of liquid into the interior of the protective jacket which, if permitted, would cause deterioration by rusting.

Further objects and advantages of the invention will appear from the following description of certain typical embodiments thereof.

Figure 1:
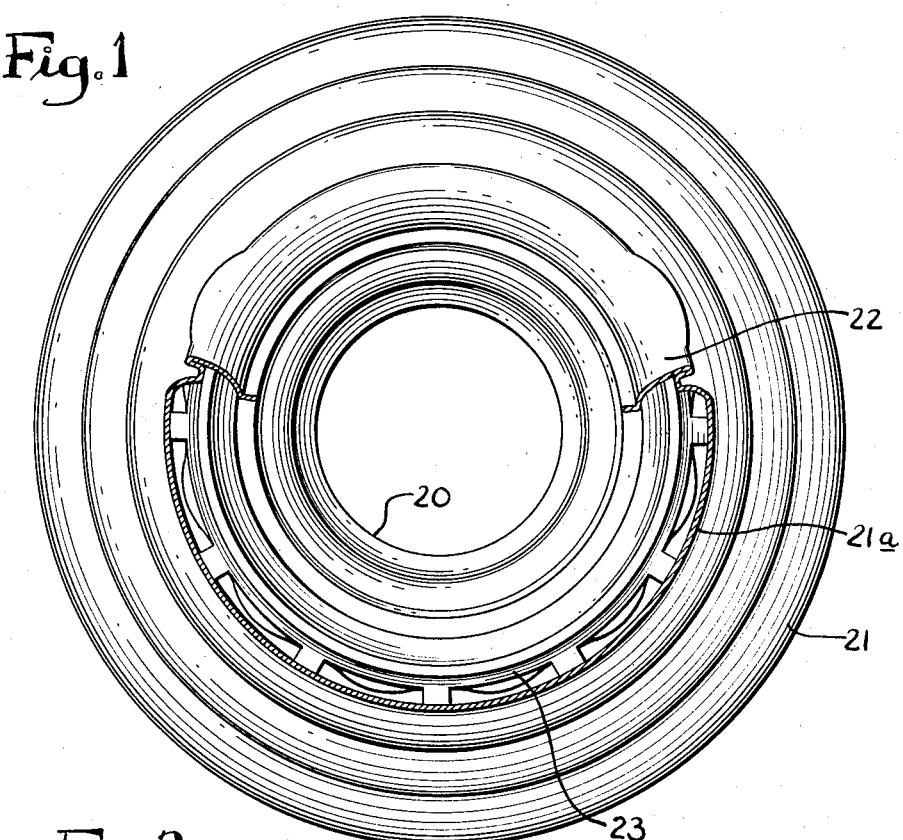
Figure 2:
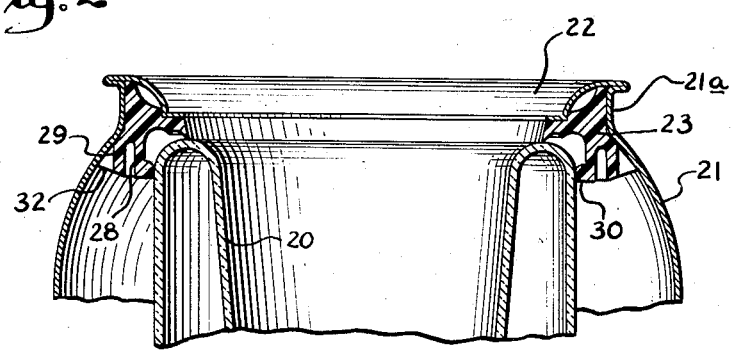
Figure 3:
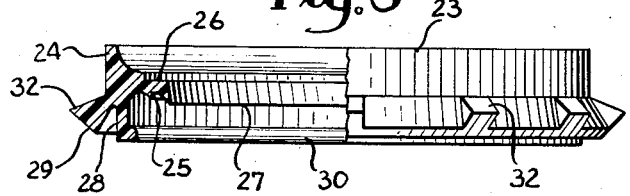
Figure 4:
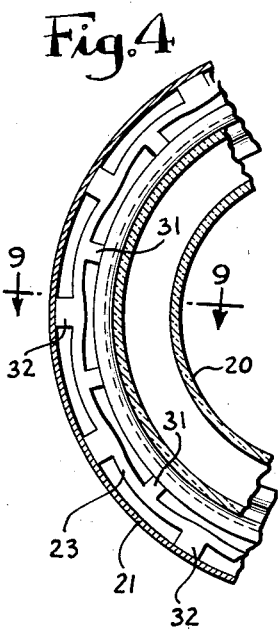
Figure 5:
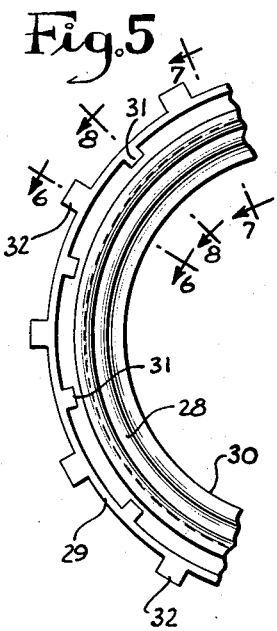
Figure 10:
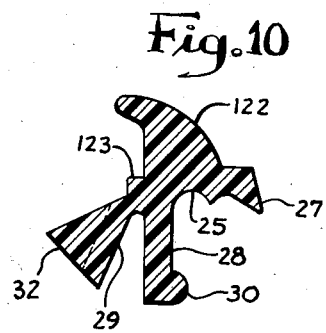
Figure 11:
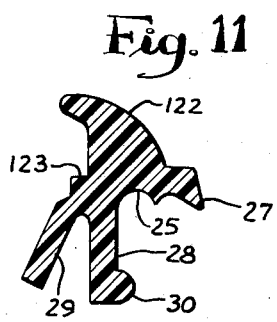
Figure 6:
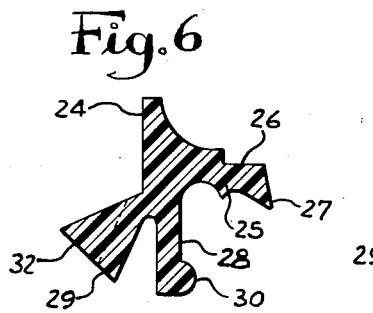
Figure 7:
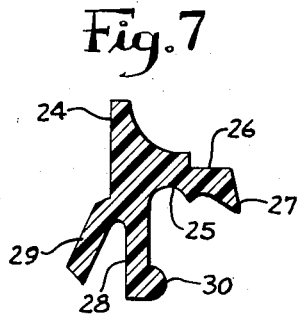
Figure 12:
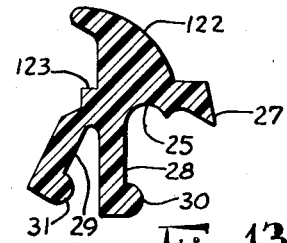
Figure 9:
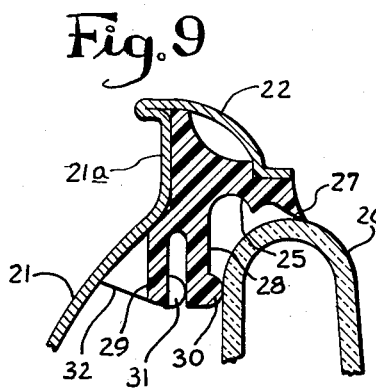
Figure 8:
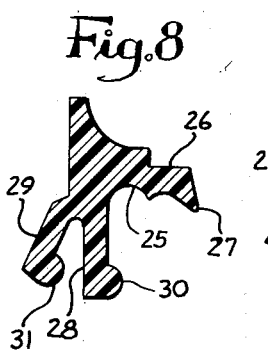
Figure 13:
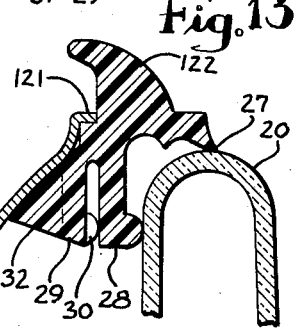

In the appended drawing, Figure 1 is a plan view, partially cut away, of a vacuum bottle embodying a sealing gasket in accordance with the present invention. Fig. 2 is a fragmentary sectional view of the Fig. 1 bottle, showing the relative positions of the glass filler and the protective jacket of the bottle after assembly and bringing out the manner in which the sealing gasket of the present invention cooperates with the filler and jacket. Fig. 3 is a side elevation view, partially cut away and partially in section, of a typical sealing gasket in accordance with my invention. Fig. 4 is a fragmentary sectional view of an arcuate sector of the Fig. 1 vacuum bottle, showing the manner in which the sealing gasket of the present invention adapts itself to small variations in the size of the filler. Fig. 5 is a fragmentary bottom view of a typical sealing gasket in accordance with my invention. Fig. 6 is a view in transverse section through the sealing gasket of Fig. 5, the section being taken on the line 6—6 of Fig. 5. Fig. 7 is a view similar to Fig. 6 but taken along the line 7—7 of Fig. 5. Fig. 8 is a view similar to Fig. 6 but taken along the line 8—8 of Fig. 5. Fig. 9 is a fragmentary sectional view showing the relative positions of the various parts of my novel sealing gasket after it has been assembled and compressed into position between the glass filler of the vacuum bottle and the outer protective jacket thereof, the section being taken along the line 9—9 of Fig. 4. Fig. 10 is a sectional view of an alternative form of sealing gasket in accordance with my invention, the gasket in Fig. 10 being formed to provide a pouring lip for the vacuum bottle as an integral part of the gasket. The section shown in Fig. 10 is the one corresponding to that shown in Fig. 6. Figs. 11 and 12 are sectional views of the alternative form of gasket illustrated in Fig. 10, the sections respectively corresponding to those shown in Figs. 7 and 8. Fig. 13 is a fragmentary sectional view corresponding to Fig. 9 showing the alternative form of gasket illustrated in Fig. 10 as it appears when mounted in position between the filler and the protective jacket of a vacuum bottle.

Referring now to Figs. 1 and 2, I show therein a vacuum botle comprising a vacuum-insulating glass filler 20 surrounded by an outer protective jacket or enclosure 21 which, in this embodiment, is shown as formed of sheet metal. The upper part of the protective jacket 21 is constricted to provide an annular upper portion 21a which is modified by folding to define an annular pouring lip 22.

As may be seen from Figs. 1 and 2, the glass filler 20 is centrally disposed within the protective jacket 21 and, in the assembled vacuum bottle, the upper end of the filler 20 and the upper portion 21a of the protective jacket are separated by a sealing gasket 23, which provides a liquid seal and also serves as a support means and centering device to maintain the filler and the jacket in the correct relative positions. It will be understood that in an assembled vacuum bottle incorporating my invention, some suitable means (not shown) will be provided for applying a moderate upward pressure on the filler 20 relative to the jacket 21 so as to maintain the upper portion of the filler pressed firmly against the abutting portions of the sealing gasket 23. In a typical case, this will be achieved by a suitable resilient spacer member interposed between the bottom of filler 20 and the bottom of jacket enclosure 21. Any of numerous conventional arrangements of this sort may be employed, and, since such structure is not a part of the present invention, it will not be specifically described herein.

The sealing gasket 23 is made of any suitable relatively hard plastic such as polyethylene, having the properties of moderate resiliency in thin sections and being characterized, as such plastics normally are, by low cost, extremely low porosity, and absence of taste and odor. (As I pointed out in my aforementioned copending application Serial No. 594,029, the sealing gaskets in prior-art vacuum bottles have normally been made of soft natural or synthetic rubber, which is expensive, difficult and expensive to mold, and characterized by objectionable taste and odor.)

The structural details of the gasket 23 are brought out to some degree in all of the Figs. 1–9, but particularly in Figs. 3, 5, and 6–8.

Gasket 23 has, around its upper extremity, a cylindrical body portion 24 molded to fit accurately within the top portion 21a of the metal protective jacket 21. Since metal parts can be dimensioned very accurately in commercial production, the sliding fit between body portion 24 of the gasket 23 and the inner surface of portion 21a of jacket 21 can be readily maintained. Inwardly of the body portion 24, gasket 23 is provided with an annular flange 25 which is modified on its upper surface to provide a flat annular area 26 adapted to mate with the inner edge of the pouring lip 22. Flange 25 terminates at its inner edge in a relatively sharp downwardly disposed sealing edge 27 which is adapted to press against the rounded uppermost surface of the filler 20, as shown best in Figs. 2 and 9. This sealing edge 27 will normally provide an effective liquid-tight seal with filler 20 when the filler 20 is assembled in the completed vacuum bottle. The plastic of which gasket 23 is formed is sufficiently flexible that the sealing edge 27 can yield slightly where necessary to maintain a seal around the entire upper surface of filler 20 despite slight irregularities in the glass surface of filler 20. As will be hereafter explained, however, the gasket 23 provides an additional liquid seal to prevent leakage into the interior of jacket 21 even if the seal provided by edge 27 should, in a particular case, be somewhat less than perfect.

Depending downwardly from the body portion 24 of gasket 23 is a concentric pair of annular skirts, the inner skirt being designated 28 and the outer skirt being designated 29. Both skirts 28 and 29 are molded in the form of relatively thin and hence appreciably flexible webs. The inner skirt 28 is provided, around its entire periphery, with a sealing lip 30 of rounded conformation, projecting inwardly, as shown in Figs. 2–3 and 6–9.

The outer skirt 29 of gasket 23 is provided with two sets of local projections, on the inside and outside of the skirt respectively. The inner projections 31 are spacedly distributed around the periphery of the skirt and are proportioned, as brought out in Fig. 8, so as to clear slightly the outer surface of skirt 28 when the gasket is not subjected to any external forces. The inner projections 31 are equi-angularly spaced around the periphery of skirt 29. The number of such projections is a matter of design; normally, I find about twelve such projections to be adequate.

The aforementioned local projections extending outwardly from the skirt 29 are buttress-like in shape and are designated on the drawings by the numeral 32. The outer projections 32 are preferably equal in number to the inner projections 31, are likewise equi-angularly spaced around the periphery of the skirt 29, and are disposed in symmetrically staggered relationship with the inner projections 31. This is brought out clearly in Figs. 4 and 5.

As previously mentioned, the glass fillers used in vacuum bottles cannot, in regular commercial production, be held to the same dimensional standards as can parts stamped from sheet metal or molded from plastic. While the fillers in a production run will all be substantially the same size, small dimensional differences between one filler and another will inevitably be encountered. It is in accommodating such differences in filler size that my novel gasket finds its greatest utility.

The inner diameter of the skirt 28, as defined by the innermost portion of lip 30, is chosen so as to be very slightly smaller than the smallest permissible outer diameter for the neck of filler 20. In other words, the skirt 28 is so dimensioned that it is at all times stretched slightly in passing over the neck of filler 20, so that the lip 30 is by the tension made to conform closely and hence seal with the outer surface of the filler. Since the material of which gasket 23 is formed is plastic in character, it will gradually change its molecular orientation in an effort to relieve the aforementioned tension, with the result that after a short time the skirt 28 and lip 30 will adjust itself to form a perfect fit over the outer surface of filler 20, notwithstanding small variations in the size of the filler from one bottle to another and notwithstanding minor irregularities in the shape of any particular filler.

This tendency on the part of skirt 28 to form a perfect seal with the filler 20 is further enhanced by the cooperative action of skirt 29 and the projections thereon. When a vacuum bottle embodying my invention is assembled, as shown in Figs. 2 and 9, the buttress-like outer projections 32 on the skirt 29 are pressed inwardly by contact with the inner surface of jacket 21. This causes the inner projections 31 on the skirt 29 to bear against the outer face of skirt 28. In the normal case, the neck of filler 20 will be large enough in outer diameter to strain the web of the outer skirt 29 and hence to force it into a wavy pattern as shown in Fig. 4. This feature and its attendant advantages have been disclosed and discussed in my aforementioned copending application Serial No. 594,029.

For present purposes, it will suffice to point out that the outer skirt 29 and projections 31 cause to be maintained on the inner skirt 28 a symmetrically distributed inner pressure around the periphery of the inner skirt, thus further insuring that the sealing lip 30 carried by skirt 28 will snugly engage the filler 20 and form a seal with it all the way around.

As previously mentioned, the seal achieved by lip 30 is in the nature of a secondary line of defense against liquid leakage into the interior of jacket 21, the first seal for that purpose being achieved by the annular edge 27 which is pressed against the top surface of filler 20 when the jacket 21 and filler 20 are brought together in assembled relation.

Figs. 10–13 show an alternative type of sealing gasket in accordance with my invention in which the pouring lip is integrally molded into the gasket itself, rather than being formed in the jacket 21. In Figs. 10–12, this pouring lip is designated 122 and may have the same general shape as the lip 22 of the Fig. 1 embodiment. Apart from this modification of the upper portion, the gasket of Figs. 10–13 is similar in construction and operation to the gasket 23 of the Fig. 1 embodiment. Bringing this out, the various parts of the gasket of Figs. 10–13 are numbered with the same reference numerals as the corresponding parts of gasket 23 in Figs. 1–9.

As shown in Fig. 13, the jacket 21 intended for use with a sealing gasket of the Fig. 10 type will not include any vertical neck portion 21a or pouring lip 22. Instead, the upper end of jacket 21 may terminate in an inwardly extending annular flange 121, proportioned to bear against and mate with an annular ledge or shoulder 123 formed on the outer surface of the sealing gasket above the skirts 28 and 29. When the jacket and filler are brought together in assembled relationship, the flange 121 will bear against and apply compressive force to the sealing gasket via the shoulder 123, resulting in the formation of a liquid seal at annular edge 27, as in the first-described embodiment of my invention.

In the embodiment of Figs. 10–13, the skirts 23 and 29, and the sealing lip 30, perform the same functions in the same manner as do the corresponding parts of the sealing gasket in the Fig. 1 embodiment.

While I have in this specification described in considerable detail two typical embodiments of my invention, it should be understood that these descriptions are intended to be illustrative rather than limiting. Many variations in matters of detail may be made in the structures shown without departing from the true spirit and scope of my invention.

I claim:

1. In a vacuum bottle, the combination comprising a glass vacuum-insulated filler having an annular upper edge and a generally cylindrical outer surface extending downwardly therefrom, a protective jacket surrounding said filler and having an annular wall spaced outwardly from the outer surface of said filler, said jacket having adjacent its upper end an inwardly extending annular flange, and an annular gasket formed of resilient stretchable material seated between said flange and said filler for centering said filler within said jacket and preventing leakage of liquid between said jacket and said filler, said gasket having on its upper side an annular shoulder portion dimensioned for engagement with said flange and having also an annular sealing edge dimensioned and positioned for engagement with said upper edge of said filler, said gasket being formed in its lower portion to define a pair of concentric downwardly depending annular skirts, the inner of said skirts being dimensioned to provide a stretch fit with said filler wall, the outer of said skirts having a plurality of outer local projections thereon distributed therearound in angularly spaced relation and having a plurality of inner local projections disposed in staggered relation with said outer projections, said outer skirt being substantially circular when in a free state but being flexed into a wave-like conformation when said outer projections are in engagement with said jacket wall, said inner projections bearing against said inner skirt when said outer skirt is thus flexed.

2. In a vacuum bottle, the combination comprising a glass vacuum-insulated filler having an annular upper edge and a generally cylindrical outer surface extending downwardly therefrom, a protective jacket surrounding said filler and having an annular wall spaced outwardly from the outer surface of said filler, said jacket having adjacent its upper end an inwardly extending annular flange, and an annular gasket formed of resilient stretchable material seated between said flange and said filler for centering said filler within said jacket and preventing leakage of liquid between said jacket and said filler, said gasket having on its upper side an annular shoulder portion dimensioned for engagement with said flange and having also an annular sealing edge dimensioned and positioned for engagement with said upper edge of said filler, said gasket being formed in its lower portion to define a pair of concentric downwardly depending annular skirts, the inner of said skirts being dimensioned to provide a stretch fit with said filler wall and having on its inner face an annular sealing lip, the outer of said skirts having a plurality of outer local projections thereon distributed therearound in angularly spaced relation and having a plurality of inner local projections disposed in staggered relation with said outer projections, said outer skirt being substantially circular when in a free state but being flexed into a wave-like conformation when said outer projections are in engagement with said jacket wall, said inner projections bearing against said inner skirt when said outer skirt is thus flexed.

3. In a vacuum bottle, the combination comprising a glass vacuum-insulated filler having an annular upper edge and a generally cylindrical outer surface extending downwardly therefrom, a protective jacket surrounding said filler and having an annular wall spaced outwardly from the outer surface of said filler, said jacket having adjacent its upper end an inwardly extending annular flange, and an annular gasket formed of resilient stretchable material seated between said flange and said filler for centering said filler within said jacket and preventing leakage of liquid between said jacket and said filler, said gasket having on its upper side an annular shoulder portion dimensioned for engagement with said flange and having also an annular sealing edge dimensioned and positioned for engagement with said upper edge of said filler, said gasket being formed in its lower portion to define a pair of concentric downwardly depending annular skirts, the inner of said skirts being dimensioned to provide a stretch fit with said filler wall, the outer of said skirts having a plurality of outer local projections thereon distributed therearound in angularly spaced relation and an equal number of inner local projections on the inner face of said outer skirt symmetrically staggered with respect to said outer projections, said outer skirt being substantially circular when in a free state but being flexed into a wave-like conformation when said outer projections are engaged by said jacket wall, said inner projections bearing against said inner skirt when said outer skirt is thus flexed.

4. The combination of claim 1 wherein the upper portion of said gasket is additionally provided with an outwardly flaring annular rim extending above the upper end of said jacket and adapted to serve as a pouring lip for said bottle.

5. For use in a vacuum bottle as a sealing and centering device to be interposed between a glass vacuum-insulated filler and an outer protective jacket, an annular gasket formed of resilient stretchable material having in its upper portion an inwardly extending annular flange provided on its under surface with a sealing lip, and having in its lower portion a pair of downwardly extending concentric annular skirts, the inner of said skirts being adapted to form a ring seal with an abutting cylindrical surface and the outer of said skirts having a plurality of outer local projections thereon distributed therearound in angularly spaced relation and having a plurality of inner local projections disposed angularly therearound in staggered relation with said outer projections, said inner skirt extending downwardly to a sufficient degree to be engaged by said inner projections on said outer skirt when said outer skirt is subjected to flexing force.

6. For use in a vacuum bottle as a sealing and centering device to be interposed between a glass vacuum-insulated filler and an outer protective jacket, an annular gasket formed of resilient stretchable material having in its upper portion an inwardly extending annular flange provided on its under surface with a sealing lip, and having in its lower portion a pair of downwardly extending concentric annular skirts, the inner of said skirts being adapted to form a ring seal with an abutting cylindrical surface and having on its inner face an annular sealing lip, the outer of said skirts having a plurality of outer local projections thereon distributed therearound in angularly spaced relation and having a plurality of inner local projections disposed angularly therearound in staggered relation with said outer projections, said inner skirt extending downward sufficiently to be engaged by said inner projections of said outer skirt when said outer skirt is subjected to flexing force.

7. For use in a vacuum bottle as a sealing and centering device to be interposed between a glass vacuum-insulated filler and an outer protective jacket, an annular gasket formed of resilient stretchable material having in its upper portion an inwardly extending annular flange provided on its under surface with a sealing lip, and having in its lower portion a pair of downwardly extending concentric annular skirts, the inner of said skirts being adapted to form a ring seal with an abutting cylindrical surface and the outer of said skirts having a plurality of outer local projections thereon distributed therearound in angularly spaced relation and having an equal number of inner local projections disposed around the inner surface of said outer skirt in symmetrically staggered relation to said outer projections, said inner skirt extending downward sufficiently to be engaged by said inner projections when said outer skirt is subjected to flexing force.

8. The gasket of claim 5 having also in its upper portion an outwardly flaring annular rim adapted to serve as a pouring lip.

No references cited.